US012684619B2

(12) United States Patent
Kumagai et al.

(10) Patent No.: US 12,684,619 B2
(45) Date of Patent: Jul. 14, 2026

(54) TRANSMISSION NODE AND COMMUNICATION METHOD

(71) Applicant: NTT DOCOMO, INC., Tokyo (JP)

(72) Inventors: Shinya Kumagai, Tokyo (JP); Masaya Okamura, Tokyo (JP); Mayuko Okano, Tokyo (JP); Yuki Takahashi, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 411 days.

(21) Appl. No.: 18/264,336

(22) PCT Filed: Feb. 22, 2021

(86) PCT No.: PCT/JP2021/006704
§ 371 (c)(1),
(2) Date: Aug. 4, 2023

(87) PCT Pub. No.: WO2022/176214
PCT Pub. Date: Aug. 25, 2022

(65) Prior Publication Data
US 2024/0098787 A1      Mar. 21, 2024

(51) Int. Cl.
*H04W 74/0816*      (2024.01)
*H04W 74/04*      (2009.01)
*H04W 74/08*      (2024.01)

(52) U.S. Cl.
CPC ....... *H04W 74/0816* (2013.01); *H04W 74/04* (2013.01); *H04W 74/0866* (2013.01)

(58) Field of Classification Search
CPC ............. H04W 74/04; H04W 74/0808; H04W 74/0816; H04W 74/0866
See application file for complete search history.

(56) References Cited

U.S. PATENT DOCUMENTS 10,912,128 B2      2/2021  Li et al.
2016/0353389 A1*  12/2016  Wang .................... H04W 52/44
(Continued)

FOREIGN PATENT DOCUMENTS

EP          3098975 A1    11/2016
EP          3496502 A1    6/2019
(Continued)

OTHER PUBLICATIONS

Extended European Search Report issued in Application No. 21926643. 4, mailed Oct. 15, 2024 (10 pages).
(Continued)

*Primary Examiner* — Kashif Siddiqui
(74) *Attorney, Agent, or Firm* — Osha Bergman Watanabe & Burton LLP

(57)          ABSTRACT
A transmission node includes: a reception unit configured to execute an LBT (Listen before talk) in a time interval immediately before transmitting a signal; a transmission unit configured to transmit a signal in a case where reception power is less than a threshold value in the time interval; and a control unit configured to, in a case where multiple signals are to be transmitted, change control related to the LBT for a signal to be transmitted for a first time and change control related to the LBT for a signal to be transmitted other than for the first time.

6 Claims, 9 Drawing Sheets

(56) References Cited

U.S. PATENT DOCUMENTS

| | | | |
|---|---|---|---|
| 2017/0339717 A1 | 11/2017 | Futaki | |
| 2019/0132882 A1 | 5/2019 | Li et al. | |
| 2019/0230706 A1* | 7/2019 | Li | H04W 72/046 |
| 2021/0007128 A1 | 1/2021 | Bhattad et al. | |
| 2021/0037564 A1* | 2/2021 | Futaki | H04W 72/21 |
| 2021/0266962 A1* | 8/2021 | Chendamarai Kannan | H04W 74/0816 |
| 2022/0104253 A1* | 3/2022 | Xiong | H04W 74/0808 |

FOREIGN PATENT DOCUMENTS

| | | | |
|---|---|---|---|
| WO | 2016103533 A1 | 6/2016 | |
| WO | 2019195563 A1 | 10/2019 | |
| WO | 2020033721 A1 | 2/2020 | |
| WO | 2020168103 A1 | 8/2020 | |

OTHER PUBLICATIONS

Office Action issued in Japanese Patent Application No. 2023-500504, dated Oct. 8, 2024 (6 pages).

3GPP TS 38.300 V16.3.0; "3rd Generation Partnership Project; Technical Specification Group Radio Access Network; NR; NR and NG-RAN Overall Description; Stage 2 (Release 16)" Sep. 2020 (148 pages).

NTT Docomo, Inc.; White Paper "5G Evolution and 6G"; Jan. 2020 (34 pages).

International Search Report issued in PCT/JP2021/006704 on Sep. 14, 2021 (6 pages).

Written Opinion of the International Searching Authority issued in PCT/JP2021/006704 on Sep. 14, 2021 (4 pages).

Office Action issued in counterpart Japanese Patent Application No. 2023-500504 mailed on Feb. 12, 2025 (6 pages).

Office Action issued in Chinese Patent Application No. 202180093707.X; Dated Mar. 18, 2026 (19 pages).

* cited by examiner

FIG.5

TIME

TRANSMISSION SIGNAL

PREAMBLE

DEMODULATION

DETECTION

TRANSMISSION NODE

RECEPTION NODE

TRANSMISSION NODE AND COMMUNICATION METHOD

TECHNICAL FIELD

The present invention relates to a transmission node and a communication method in a radio communication system.

BACKGROUND ART

In the 3rd Generation partnership Project (3GPP), in order to achieve further increased system capacity, further increased data transmission speed, and further reduced latency in radio sections, studies on a radio communication method (the radio communication method will be referred to as "NR", below) called 5G or NR (New Radio) are progressing. In 5G, in order to satisfy the requirements of a latency of 1 ms or less in a radio section while achieving a throughput of 10 Gbps or greater, studies on various radio techniques and network architecture have been carried out (e.g., Non-Patent document 1).

Further, studies on 6G have started as the next generation radio communication method succeeding 5G, and it is expected that radio quality beyond 5G will be achieved. For example, in 6G, studies are underway to achieve even higher capacity, use of new frequency bands, even lower latency, even higher reliability, and extended coverage in new territories (high altitude, sea, and space) (e.g., Non-patent literature 2).

RELATED ART DOCUMENTS

Non-Patent Document

[Non-patent document 1] 3GPP TS 38.300 V 16.3.0 (2020-09)

[Non-patent document 2] NTT DOCOMO White Paper: 5G Evolution and 6G (2020-01)

SUMMARY OF THE INVENTION

Problem to be Solved by the Invention

In 6G, it is assumed that higher frequencies will be used for further improvements in communication speed, capacity, reliability, latency performance, and the like. When using the higher frequencies, a wide bandwidth is available, and a radio wave has characteristics of high straightness and low frequency selectivity. In addition, it is characterized by a large Doppler shift and a large pass loss.

Due to the characteristics of the frequency band that uses the higher frequencies, there is a likelihood that a control rule different from conventional cell design or scheduling techniques by a base station is more desirable from the viewpoint of the network performance.

The present invention has been made in view of the above, and has an object to improve the network performance in a radio communication system.

Means for Solving Problem

According to the disclosed techniques, a transmission node is provided that includes: a reception unit configured to execute an LBT (Listen before talk) in a time interval immediately before transmitting a signal; a transmission unit configured to transmit a signal in a case where reception power is less than a threshold value in the time interval; and a control unit configured to, in a case where multiple signals are to be transmitted, change control related to the LBT for a signal to be transmitted for a first time and change control related to the LBT for a signal to be transmitted other than for the first time.

Advantageous Effects of the Invention

According to the disclosed techniques, techniques to improve the reliability in the case of repeatedly executing transmissions in a radio communication system are provided.

BRIEF DESCRIPTION OF THE DRAWINGS

FIG. 5 is a diagram illustrating an example (2) of transmission and reception according to an embodiment of the present invention;

EMBODIMENTS FOR CARRYING OUT THE INVENTION

In the following, embodiments of the present invention will be described with reference to the drawings. Note that an embodiment described below merely presents an example, and an embodiment to which the present invention is applied is not limited to the following embodiments.

Existing techniques may be used, as appropriate, in operations of the radio communication system according to an embodiment of the present invention. The existing techniques are, for example, existing NR or LTE, although not limited to the existing NR or LTE.

Figure 1:
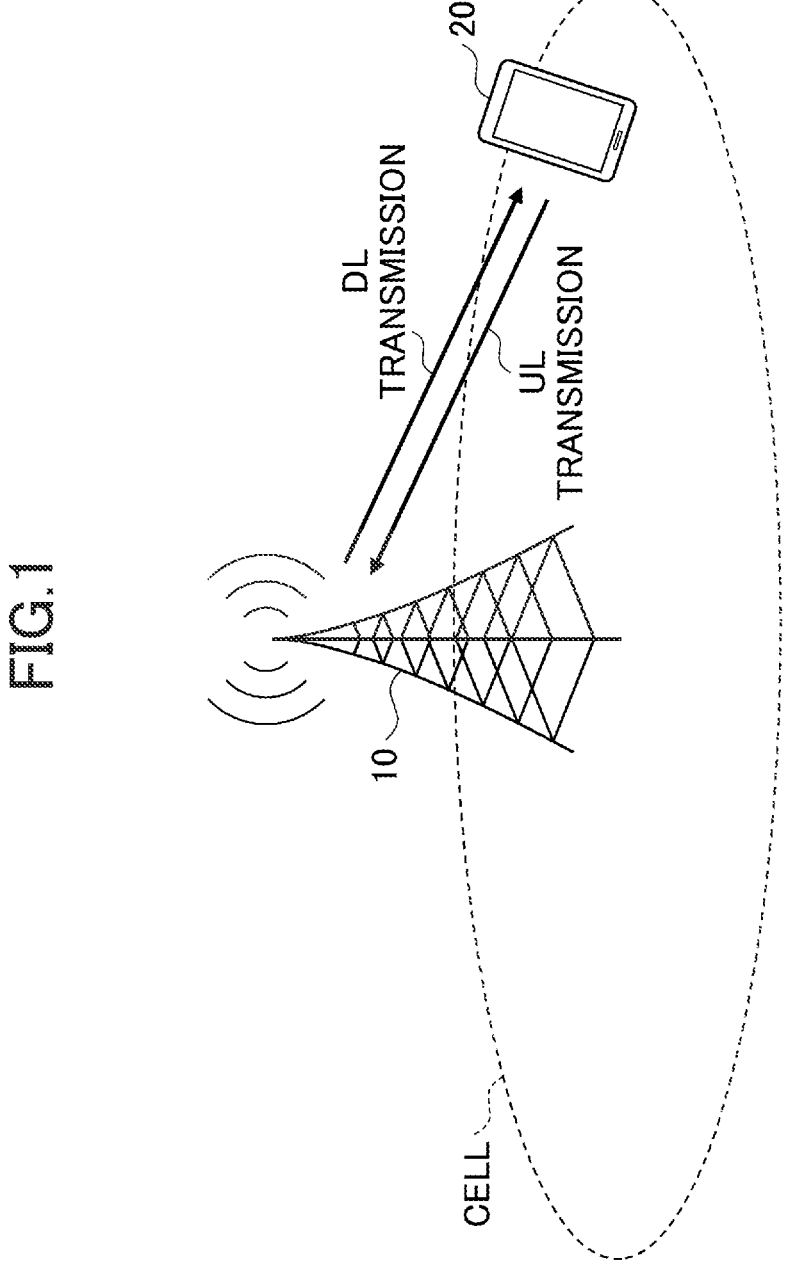
FIG. 1 is a diagram illustrating an example (1) of a radio communication system according to an embodiment of the present invention.

FIG. 1 is a diagram illustrating an example (1) of a radio communication system according to an embodiment of the present invention. The radio communication system according to the embodiment of the present invention includes a base station 10 and a terminal 20 as illustrated in FIG. 1. FIG. 1 illustrates one base station 10 and one terminal 20; however, this is an example, and there may be multiple respective devices.

The base station 10 is a communication device that provides one or more cells, and executes radio communication with the terminal 20. The physical resources of a radio signal are defined in the time domain and in the frequency domain; the time domain may be defined in terms of the number of OFDM symbols, and the frequency domain may be defined in terms of the number of subcarriers or the number of resource blocks. In addition, the transmission time interval (TTI) in the time domain may be a slot, or the TTI may be a subframe.

The base station 10 can bundle multiple cells (multiple CCs (component carriers)) for carrier aggregation to communicate with the terminal 20. In carrier aggregation, one PCell (primary cell) and one or more SCells (secondary cells) are used.

The base station 10 transmits a synchronization signal, system information, and the like to the terminal 20. The synchronization signal includes, for example, an NR-PSS and an NR-SSS. The system information is transmitted through, for example, an NR-PBCH or PDSCH, and is also referred to as broadcast information. As illustrated in FIG. 1, the base station 10 transmits a control signal or data to the terminal 20 in DL (Downlink), and receives a control signal or data from the terminal 20 in UL (Uplink). Note that here, what is transmitted through a control channel such as a PUCCH or PDCCH is referred to as the control signal, and what is transmitted through a shared channel such as a PUSCH or PDSCH is referred to as the data; however, such terminologies are examples.

The terminal 20 is a communication device equipped with radio communication functions, such as a smartphone, mobile phone, tablet, wearable terminal, and communication module for machine-to-machine (M2M). As illustrated in FIG. 1, the terminal 20 uses various communication services provided by the radio communication system, by receiving control signals or data from the base station 10 in DL and transmitting control signals or data to the base station 10 in UL. Note that the terminal 20 may be referred to as UE, and the base station 10 may be referred to as gNB.

The terminal 20 can bundle multiple cells (multiple CCs (component carriers)) for carrier aggregation to communicate with the base station 10. In carrier aggregation, one PCell (primary cell) and one or more SCells (secondary cells) are used. In addition, a PUCCH-SCell having a PUCCH may be used.

Figure 2:
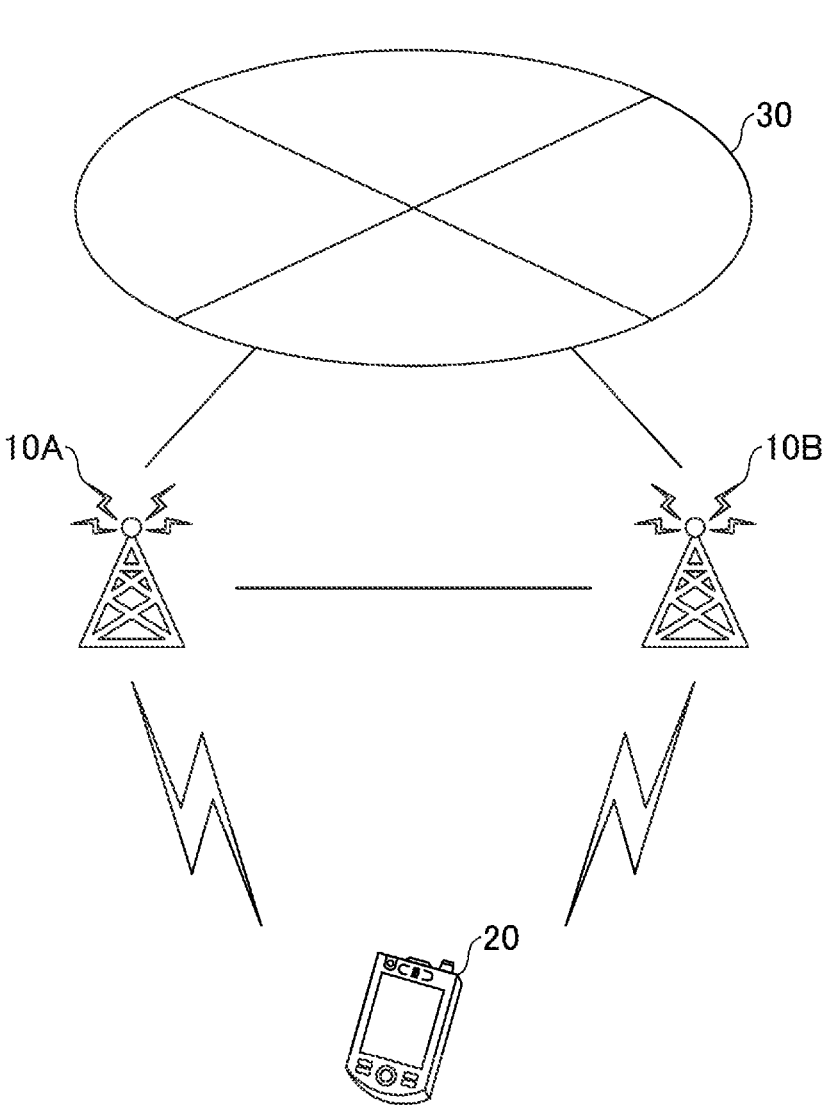
FIG. 2 is a diagram illustrating an example (2) of a radio communication system according to an embodiment of the present invention.

FIG. 2 is a diagram illustrating an example (2) of a radio communication system according to an embodiment of the present invention. FIG. 2 illustrates an example configuration of a radio communication system in the case where DC (Dual connectivity) is executed. As illustrated in FIG. 2, a base station 10A that serves as the Master Node (MN) and a base station 10B that serves as the Secondary Node (SN) are provided. Each of the base station 10A and the base station 10B are connected to a core network. The terminal 20 can communicate with both the base station 10A and the base station 10B.

A cell group provided by the base station 10A serving as the MN will be referred to as an MCG (Master Cell Group), and a cell group provided by the base station 10B serving as the SN will be referred to as an SCG (Secondary Cell Group). In addition, in the DC, the MCG is constituted by one PCell and one or more SCells, and the SCG is constituted by one PSCell (Primary SCG Cell) and one or more SCells.

Note that the DC may be a communication method using two communication standards, or any communication standards may be combined. For example, the combination may be either of NR and 6G standards, or LTE and 6G standards. In addition, the DC may be a communication method using three or more communication standards, and may be called by another term different from DC.

Processing operations in the present embodiment may be executed in the system configuration illustrated in FIG. 1, may be executed in the system configuration illustrated in FIG. 2, or may be executed in a system configuration other than these.

Here, in 6G, it is assumed that higher frequencies will be used for further improvements in communication speed, capacity, reliability, latency performance, and the like. In the case of using the higher frequencies, a wide bandwidth is available, and a radio wave has characteristics of high straightness and low frequency selectivity. In addition, it is characterized by a large Doppler shift and a large pass loss.

Due to the characteristics of the frequency band that uses the higher frequencies, there is a likelihood that control rules different from conventional cell design or scheduling techniques by a base station are more desirable from the viewpoint of the network performance. For example, it is assumed that the needs for conflict avoidance between DL-DL, between DL-UL, and between UL-UL and for interference reduction between cells is not as high as with conventional low frequencies.

Figure 3:
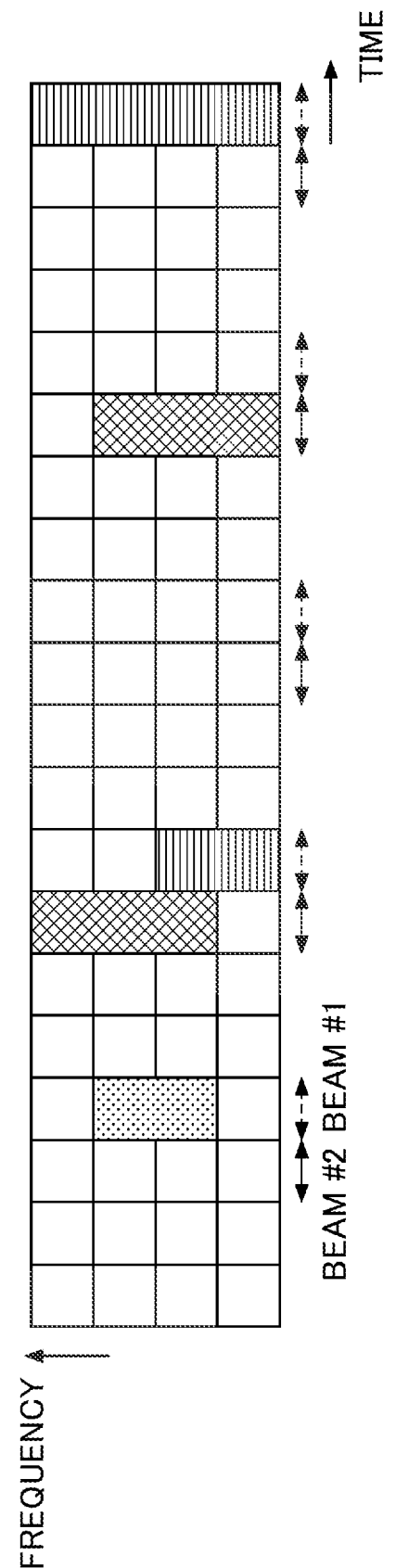
FIG. 3 is a diagram illustrating an example of scheduling.

FIG. 3 is a diagram illustrating an example of scheduling. In the example illustrated in FIG. 3, beamforming of the base station 10 is implemented in analog, and scheduling by time division multiplexing (TDM) is executed for each beam. As illustrated in FIG. 3, a beam #1 and a beam #2 are multiplexed by TDM. In the example illustrated in FIG. 3, the base station 10 executes scheduling by TDM for the terminal 20A and the terminal 20B using the beam #1, and for the terminal 20 C using the beam #2. In the case where the base station 10 is explicitly or implicitly notified by the terminal 20 timings to execute DL transmission and UL reception using the respective beams, the terminal 20 may execute DL reception and UL transmission only at timings when the beam used by itself is used. In addition, in the case where the terminal 20 is explicitly or implicitly notified by the base station 10 timings to execute DL reception and UL transmission, the base station 10 may execute DL transmission and UL reception by using the beam that is used for communication with the terminal 20 only at the timings.

As control rules that do not depend on scheduling, for example, the following control rule A) and control rule B) may be considered.

Control rule A) A transmission-side device executes transmission of a signal at any timing; this rule is applied to both the base station 10 and the terminal 20. A reception-side device needs to detect a signal at every timing when both the base station 10 and the terminal 20 can receive a signal. In the case where a conflict occurs in the resources used for transmission, the conflict is subject to processing equivalent to that related to a decoding error, and retransmission by feedback may be executed. In a frequency band that uses higher frequencies than in a conventional band, as the beam is very thin and the area is narrow, the number of terminals 20 located in a predetermined beam is very small, and even in the case where scheduling by the base stations 10 is not executed, it is assumed that the probability of conflict of resources used for transmission is low.

Control rule B) A transmission-side device executes transmission of a signal upon obtaining a transmission right; this rule is applied to both the base station 10 and the terminal 20. In other words, the base station 10 and the terminal 20 execute an in-system LBT (Listen Before Talk), and then, execute transmission of signals. A reception-side device needs to detect a signal at every timing when both the base station 10 and the terminal 20 can receive a signal. A conflict of the resources used for transmission is avoided by the in-system LBT. In a frequency band that uses higher frequencies than in a conventional band, in addition to the probability of resource conflict being low, according to the control rule B, operations can be executed so as to avoid a conflict by detecting in advance a resource conflict that rarely occurs within the same beam or upon inter-cell interference.

For both the control rule A and the control rule B, a case with frame synchronization and a case without frame synchronization can be considered. In the following, a control rule in the case with frame synchronization will be referred to as a control rule A1 or a control rule B1, and a control rule in the case without frame synchronization will be referred to as a control rule A2 or a control rule B2.

For the control rule A1, the control rule A2, the control rule B1, and the control rule B2 described above, consideration is required for a transmission procedure and a signal detection procedure. In addition, for the control rule B1 and the control rule B2 described above, consideration is required for the in-system LBT. As elements of the in-system LBT, consideration is required for transmission-allowable time, semi-static transmission without an LBT, and avoidance of a conflict of frequency resources. In addition, for the control rule A2 and the control rule B2 described above, consideration is required for a preamble. In addition, for the control rule A1 and the control rule B1 described above, consideration is required for blind detection of a control signal.

Figure 4:
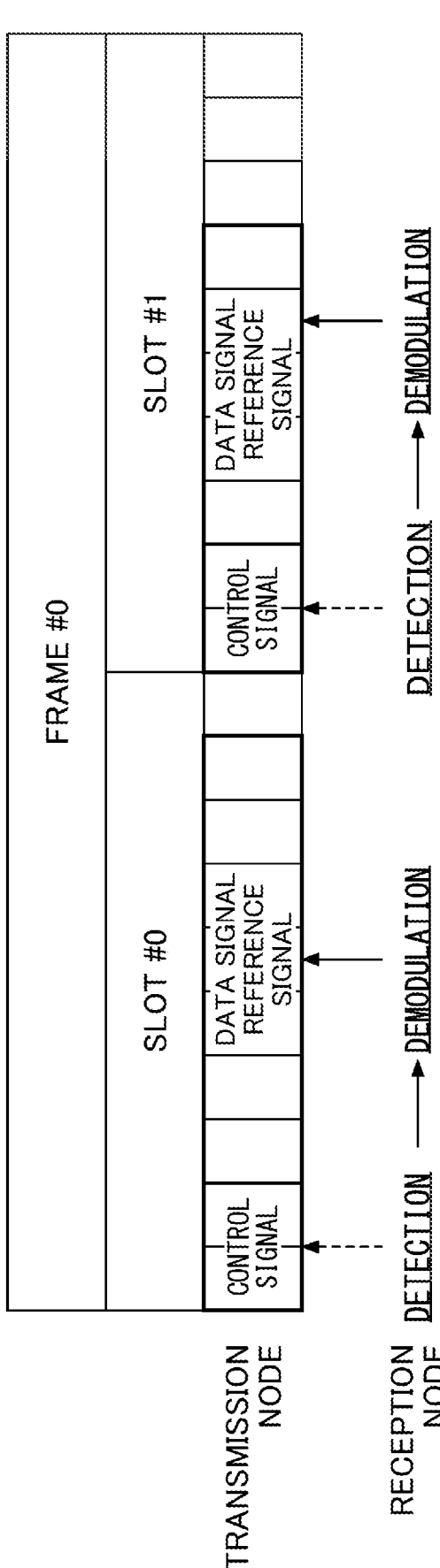
FIG. 4 is a diagram illustrating an example (1) of transmission and reception according to an embodiment of the present invention.

FIG. 4 is a diagram illustrating an example (1) of transmission and reception according to an embodiment of the present invention. Using FIG. 4, a procedure related to the control rule A1 described above will be described. In the control rule A1 described above, the following operations 1) to 4) may be executed.

1) The transmission node may transmit a signal at a predetermined transmission timing. The transmission signal may be configured with at least one of a data signal, a control signal, and a reference signal. The predetermined transmission timing may be determined by the transmission node, based on frames synchronized between the transmission node and the reception node.

2) When transmitting multiple signals consecutively, the transmission node may determine the timing of transmission other than the first transmission, based on the preceding transmitted signal. For example, a transmission timing and a transmission time length of transmission other than the first transmission may be directed to the transmission node from the reception node or may be set in advance, or may be notified to the reception node or may be set in advance. For example, the transmission timing of transmission other than the first transmission may be a timing of x symbols after the end of the preceding transmitted signal; may be a timing of y slots after the end of the preceding transmitted signal; may be a timing of z frames after the end of the preceding transmitted signal; or may be a combination of x, y and z. For example, the transmission time length of transmission other than the first transmission may be a length of L symbols long from the x-th symbol for each slot.

In FIG. 4, an example is described in which, assuming that the first transmission has been executed in a slot #0, transmission in a slot #1 is executed at a transmission timing one symbol after the end of the preceding transmitted signal, and the transmission timing and transmission time length are seven symbols long from the zeroth symbol of the slot.

3) The reception node may execute blind detection of a control signal. The resources or detection opportunity (e.g., CORESET (Control resource set) or search space) of a control signal may be specified in the specifications, or may be set or notified from the transmission node. For example, in FIG. 4, the reception node executes blind detection for a control signal that is transmitted for the first two symbols in the slot.

4) Upon detecting a control signal, the reception node may execute demodulation of a data signal. The reception node may identify the resources of data and/or reference signals, based on the detection result of a control signal. For example, in FIG. 4, when detecting a control signal that is transmitted for the first two symbols in the slot, the reception node may execute demodulation of a subsequent data signal and/or a reference signal.

Note that the correspondence between the transmission node and the reception node is as follows. In a downlink, the transmission node is the base station 10 and the reception node is the terminal 20. In an uplink, the transmission node is the terminal 20 and the reception node is the base station 10. In a side link, the transmission node is the terminal 20 and the reception node is the terminal 20.

Figure 5:
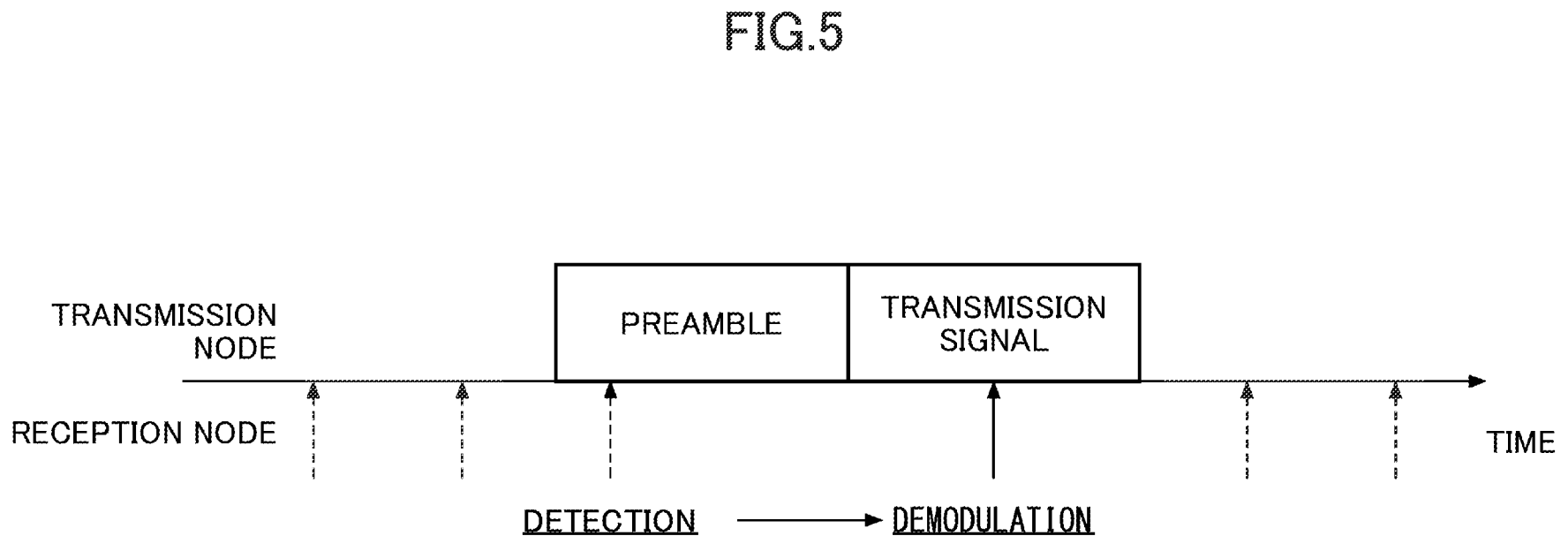

FIG. 5 is a diagram illustrating an example (2) of transmission and reception according to an embodiment of the present invention. Using FIG. 5, a procedure related to the control rule A2 described above will be described. In the control rule A2 described above, the following operations 1) to 4) may be executed.

1) As illustrated in FIG. 5, the transmission node may transmit a transmission signal with a preamble signal. The transmission signal may be configured with at least one of a data signal, a control signal, and a reference signal. The transmission node may start the transmission at any timing.

2) When transmitting multiple signals consecutively, in the case where the gap between the transmission signals is less than or equal to a predetermined value or less than the predetermined value, the transmission node does not need to add a preamble signal for transmission other than the first transmission. The predetermined value may be a threshold value. The transmission timing of a signal other than the first transmission may be determined based on the preceding transmission signal. For example, the transmission of the next signal may start X ms after the end of the preceding transmission signal.

3) The reception node may execute detection of a preamble signal. The reception node may determine that a preamble is detected when the reception power of the preamble signal is greater than or equal to a predetermined value or exceeds the predetermined value.

4) Upon detecting a preamble signal, the reception node may execute demodulation of the transmission signal. Based on the detection result of the preamble signal, the reception node may identify the resources of the transmission signal. Based on the detection result of the preamble signal, the reception node may identify the resources or detection opportunity (e.g., CORESET or search space) of the control signal, and execute blind detection of the control signal. Further, upon detecting the control signal, the reception node may execute demodulation of the data signal. The reception node may identify the resources of the data and/or reference signals, based on the detection result of the control signal.

Figure 6:
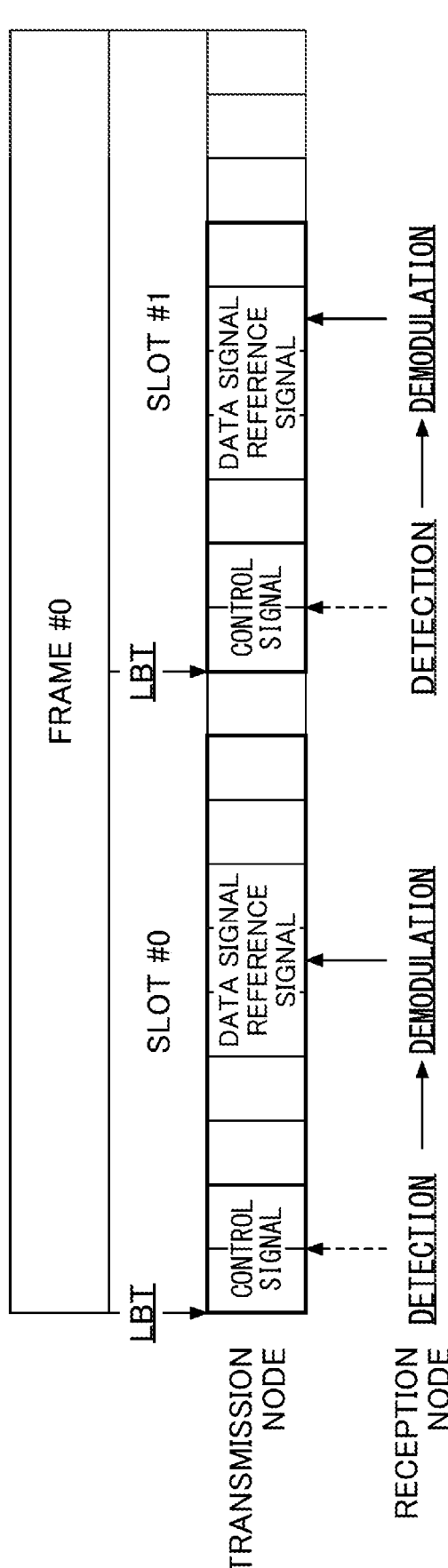
FIG. 6 is a diagram illustrating an example (3) of transmission and reception according to an embodiment of the present invention.

FIG. 6 is a diagram illustrating an example (3) of transmission and reception according to an embodiment of the present invention. Using FIG. 6, a procedure related to the control rule B1 described above will be described. In the control rule B1 described above, the following operations 1) to 4) may be executed.

1) When an LBT is successful, the transmission node may transmit a transmission signal at a predetermined transmission timing. For example, as illustrated in FIG. 6, the LBT may be executed until a timing immediately before a slot for transmitting the signal. The transmission signal may be configured with at least one of a data signal, a control signal, and a reference signal. The predetermined transmission timing may be determined based on frames synchronized between the transmission node and the reception node. The LBT may execute power detection within a predetermined time interval immediately before transmitting the transmission signal, and determine it as successful if the reception power is less than or equal to a predetermined value or less than the predetermined value. The predetermined value may be a threshold value. In the case where the LBT fails, the LBT may be executed again immediately before a predetermined transmission timing. Alternatively, timings to execute the LBT repeatedly until the LBT succeeds may be specified in the specifications, or may be set or notified in advance from the reception node. Note that in the case where the transmission node executes the LBT again and succeeds, the transmission node may transmit the same transmission signal as a signal with which the LBT fails, or may transmit a different transmission signal from the signal with which the LBT fails.

2) When transmitting multiple transmission signals consecutively, in the case where the gap between the transmission signals is less than or equal to a predetermined value or less than the predetermined value, the transmission node does not need to execute an LBT for transmission other than the first transmission. In other words, in the case where the gap between the transmitted signal and the next transmitted signal is less than or equal to a predetermined value or less than the predetermined value, the next signal to be transmitted may be transmitted without executing an LBT. The predetermined value may be a threshold value. When transmitting multiple transmission signals consecutively, in the case where the LBT is successful, the transmission node may execute transmission without executing an LBT for a predetermined period of time. When transmitting multiple transmission signals consecutively, the transmission timing of a signal other than the first transmission may be determined based on the preceding transmission signal. When transmitting multiple transmission signals consecutively, the transmission timing and transmission time of a signal other than the first transmission may be directed to the transmission node or may be set in advance, or may be notified to the reception node or may be set in advance. For example, the transmission timing of transmission other than the first transmission may be a timing of x symbols after the end of the preceding transmitted signal; may be a timing of y slots after the end of the preceding transmitted signal; may be a timing of z frames after the end of the preceding transmitted signal;

or may be a combination of x, y and z. For example, the transmission time length of transmission other than the first transmission may be a length of L symbols long from the x-th symbol for each slot.

3) The reception node may execute blind detection of a control signal. The resources or detection opportunity (e.g., CORESET or search space) of a control signal may be specified in the specifications, or may be set or notified from the transmission node. For example, in FIG. 6, the reception node executes blind detection for a control signal that is transmitted for the first two symbols in the slot.

4) Upon detecting a control signal, the reception node may execute demodulation of a data signal. The reception node may identify the resources of data and/or reference signals, based on the detection result of a control signal. For example, in FIG. 6, when detecting a control signal that is transmitted for the first two symbols in the slot, the reception node may execute demodulation of a subsequent data signal and/or a reference signal.

Figure 7:
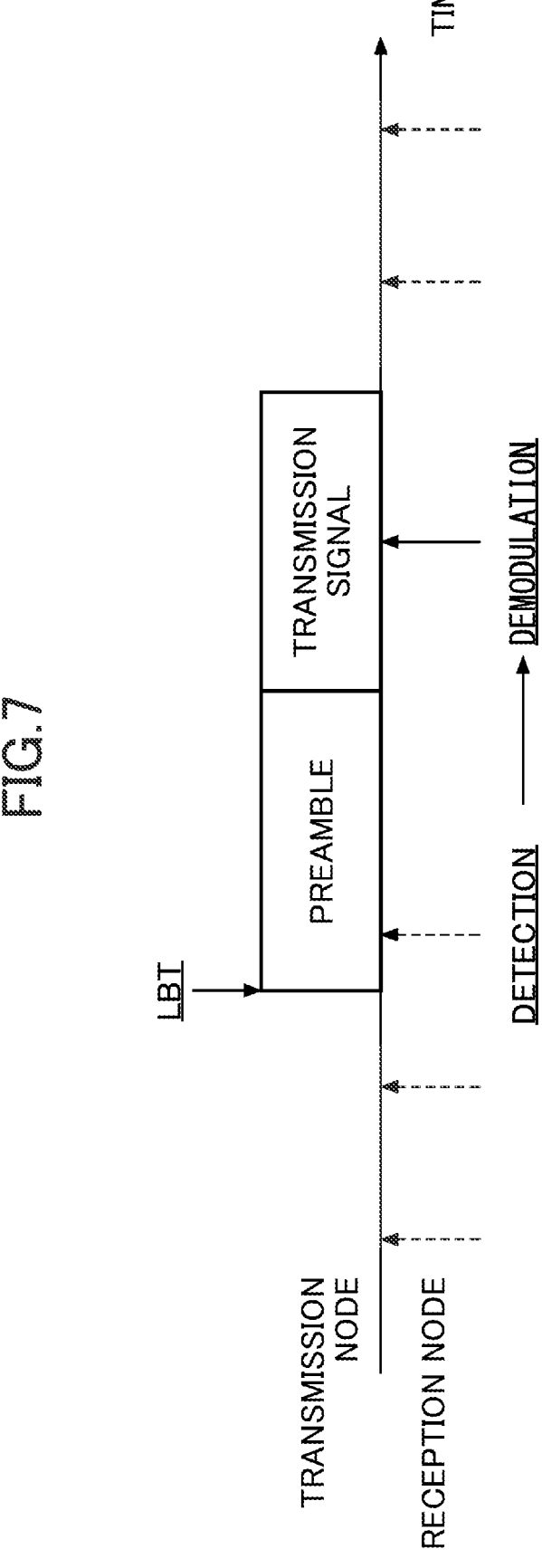
FIG. 7 is a diagram illustrating an example (4) of transmission and reception according to an embodiment of the present invention.

FIG. 7 is a diagram illustrating an example (4) of transmission and reception according to an embodiment of the present invention. Using FIG. 7, a procedure related to the control rule B2 described above will be described. In the control rule B2 described above, the following operations 1) to 4) may be executed.

1) When an LBT is successful, the transmission node may transmit a transmission signal with a preamble signal. For example, as illustrated in FIG. 7, the LBT may be executed immediately before transmitting the preamble signal. The transmission signal may be configured with at least one of a data signal, a control signal, and a reference signal. The transmission node may start the LBT and transmission at any timing. The LBT may execute power detection within a predetermined time interval immediately before transmitting the preamble signal, and determine it as successful if the reception power is less than or equal to a predetermined value or less than the predetermined value. The predetermined value may be a threshold value. In the case where the LBT fails, the LBT may be executed again immediately before any transmission timing. Alternatively, timings to execute the LBT repeatedly until the LBT succeeds may be specified in the specifications, or may be set or notified in advance from the reception node. Note that in the case where the transmission node executes the LBT again and succeeds, the transmission node may transmit the same transmission signal as a signal with which the LBT fails, or may transmit a different transmission signal from the signal with which the LBT fails.

2) When transmitting multiple signals consecutively, in the case where the gap between the transmission signals is less than or equal to a predetermined value or less than the predetermined value, the transmission node does not need to add a preamble signal for transmission other than the first transmission. The predetermined value may be a threshold value. When transmitting multiple signals consecutively, in the case where the gap between the transmission signals is less than or equal to a predetermined value or less than the predetermined value, the transmission node does not need to execute an LBT for transmission other than the first transmission. The predetermined value may be a threshold value. When transmitting multiple transmission signals consecutively, in the case where the LBT is successful, the transmission node may execute transmission without executing an LBT for a predetermined period of time. When transmitting multiple transmission signals consecutively, the transmission timing of a signal other than the first transmission may be determined based on the preceding transmission signal. For example, the transmission of the next signal may start X ms after the end of the preceding transmission signal.

3) The reception node may execute detection of a preamble signal. The reception node may determine that a preamble is detected when the reception power of the preamble signal is greater than or equal to a predetermined value or exceeds the predetermined value.

4) Upon detecting a preamble signal, the reception node may execute demodulation of the transmission signal. The reception node may identify the resources of the transmission signal, based on the detection result of the preamble signal. Based on the detection result of the preamble signal, the reception node may identify the resources or detection opportunity (e.g., CORESET or search space) of the control signal, and execute blind detection of the control signal. Further, upon detecting the control signal, the reception node may execute demodulation of the data signal. The reception node may identify the resources of the data and/or reference signals, based on the detection result of the control signal.

According to the embodiment described above, in the case where the needs for conflict avoidance between DL-DL, between DL-UL, and between UL-UL and for intercell interference reduction are not as high as with the conventional lower frequencies, the base station 10 or the terminal 20 can start signal transmission at any timing or a timing when a transmission right is obtained by an LBT, regardless of scheduling by the base station 10.

In other words, in a radio communication system, the network performance can be improved.

(Device Configuration)

Next, an example of a functional configuration of the base station 10 and the terminal 20 to execute the processes and operations described above will be described. The base station 10 and the terminal 20 include functions of executing the embodiment described above. However, each of the base station 10 and the terminal 20 may have only the functions of one of the proposals in the embodiment.

<Base Station 10>

Figure 8:
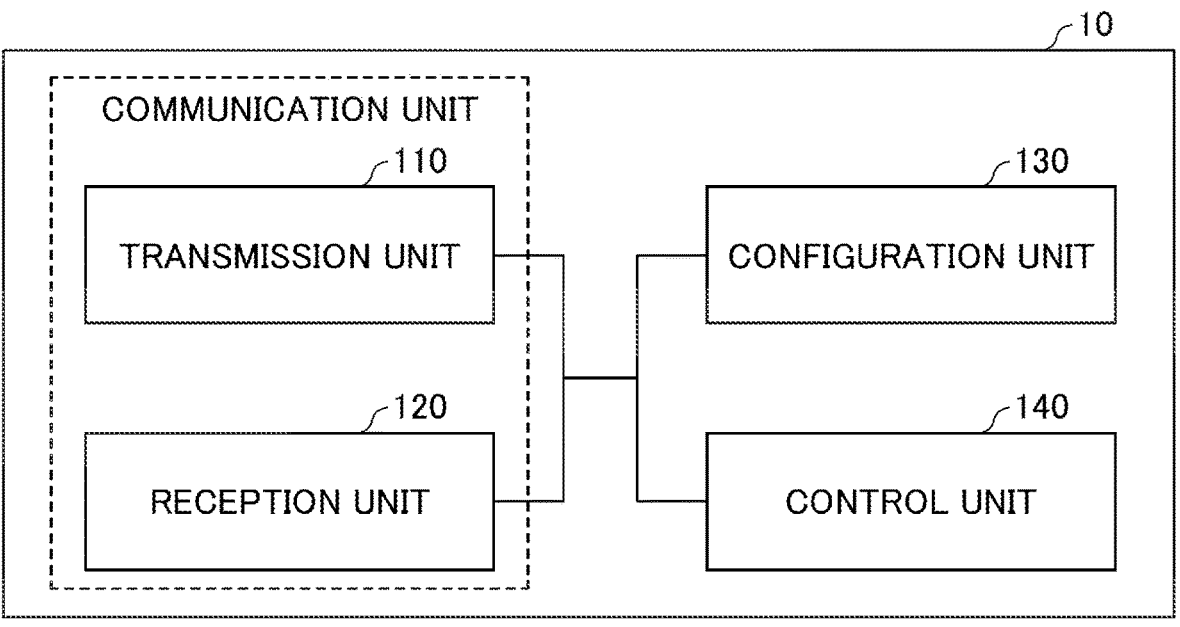
FIG. 8 is a diagram illustrating an example of a functional configuration of a base station 10 according to an embodiment of the present invention.

FIG. 8 is a diagram illustrating an example of a functional configuration of the base station 10. As illustrated in FIG. 8, the base station 10 includes a transmission unit 110, a reception unit 120, a configuration unit 130, and a control unit 140. The functional configuration illustrated in FIG. 8 is merely an example. Functional partitioning and names of the functional units may be determined discretionarily as long as operations can be executed according to the embodiments of the present invention. The transmission unit 110 and the reception unit 120 may be referred to as communication units.

The transmission unit 110 includes a function of generating a signal to be transmitted to the terminal 20 and transmitting the signal by radio. The reception unit 120 includes a function of receiving various signals transmitted from the terminal 20 and obtaining information on an upper layer, for example, from the received signals. In addition, the transmission unit 110 has a function of transmitting an NR-PSS, NR-SSS, NR-PBCH, DL/UL control T signal, DL data, or the like, to the terminal 20. In addition, the transmission unit 110 transmits configuration information and the like described in the embodiment.

The configuration unit 130 stores configuration information set in advance and various items of configuration information to be transmitted to the terminal 20 in a memory device, and reads out the configuration information from the memory device as needed. For example, the control unit 140 controls the entire base station 10, including control related to signal transmission and reception, and control related to LBT. Note that a functional unit related to signal transmission in the control unit 140 may be included in the transmission unit 110, and a functional unit related to signal reception in the control unit 140 may be included in the reception unit 120. In addition, the transmission unit 110 and the reception unit 120 may be referred to as a transmitter and a receiver, respectively.

<Terminal 20>

Figure 9:
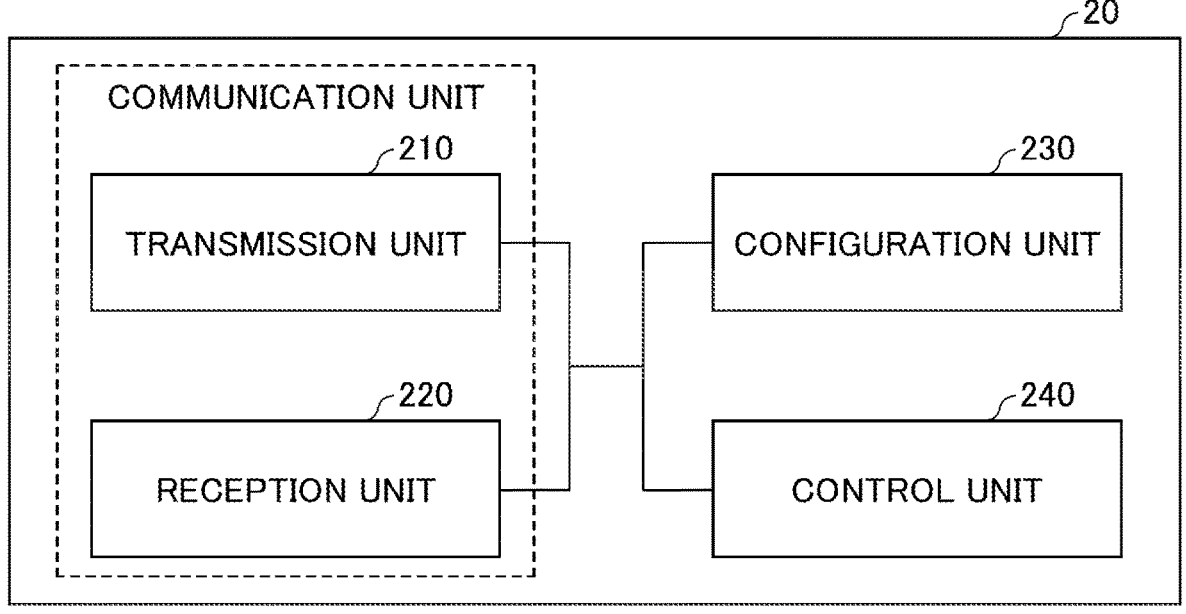
FIG. 9 is a diagram illustrating an example of a functional configuration of a terminal 20 according to an embodiment of the present invention.

FIG. 9 is a diagram illustrating an example of a functional configuration of the terminal 20. As illustrated in FIG. 9, the terminal 20 includes a transmission unit 210, a reception unit 220, a configuration unit 230, and a control unit 240. The functional configuration illustrated in FIG. 9 is merely an example. Functional partitioning and names of the functional units may be determined discretionarily as long as operations can be executed according to the embodiments of the present invention. The transmission unit 210 and the reception unit 220 may be referred to as communication units.

The transmission unit 210 generates a transmission signal from transmission data, to transmit the transmission signal by radio. The reception unit 220 receives various signals by radio, and obtains a signal of an upper layer from a received signal on the physical layer. In addition, the transmission unit 210 transmits HARQ-ACK, and the reception unit 220 receives configuration information and the like described in the embodiments.

The configuration unit 230 stores, in a memory device, various items of configuration information received from the base station 10 by the reception unit 220, and reads the information from the memory device as needed. The configuration unit 230 also stores configuration information set in advance. The control unit 240 controls the entire terminal 20, including control related to signal transmission and reception, and control related to LBT. Note that a functional unit related to signal transmission in the control unit 240 may be included in the transmission unit 210, and a functional unit related to signal reception in the control unit 240 may be included in the reception unit 220. In addition, the transmission unit 210 and the reception unit 220 may be referred to as a transmitter and a receiver, respectively.

(Hardware Configuration)

The block diagrams (FIGS. 8 and 9) used for describing the above embodiments illustrate blocks in functional units. These functional blocks (components) are implemented by any combination of at least one of hardware and software. In addition, the method of implementing the functional blocks is not limited in particular. In other words, each functional block may be implemented by using one device that is physically or logically coupled, or two or more devices that are physically or logically separated may be connected directly or indirectly (e.g., by wire or by radio) so as to implement the functional block. The functional blocks may be implemented by one or more of the above devices in combination with software.

Functions include, but are not limited to, judgment, decision, determination, calculation, computation, processing, derivation, investigation, search, confirmation, reception, transmission, output, access, resolution, selection, choice, establishment, comparison, assumption, expectation, deeming, broadcasting, notifying, communicating, forwarding, configuring, reconfiguring, allocating, mapping, and assigning. For example, a functional block (component) that implements a function of transmission may be referred to as a transmitting unit or a transmitter. In any case, as described above, implementation methods are not limited in particular.

Figure 10:
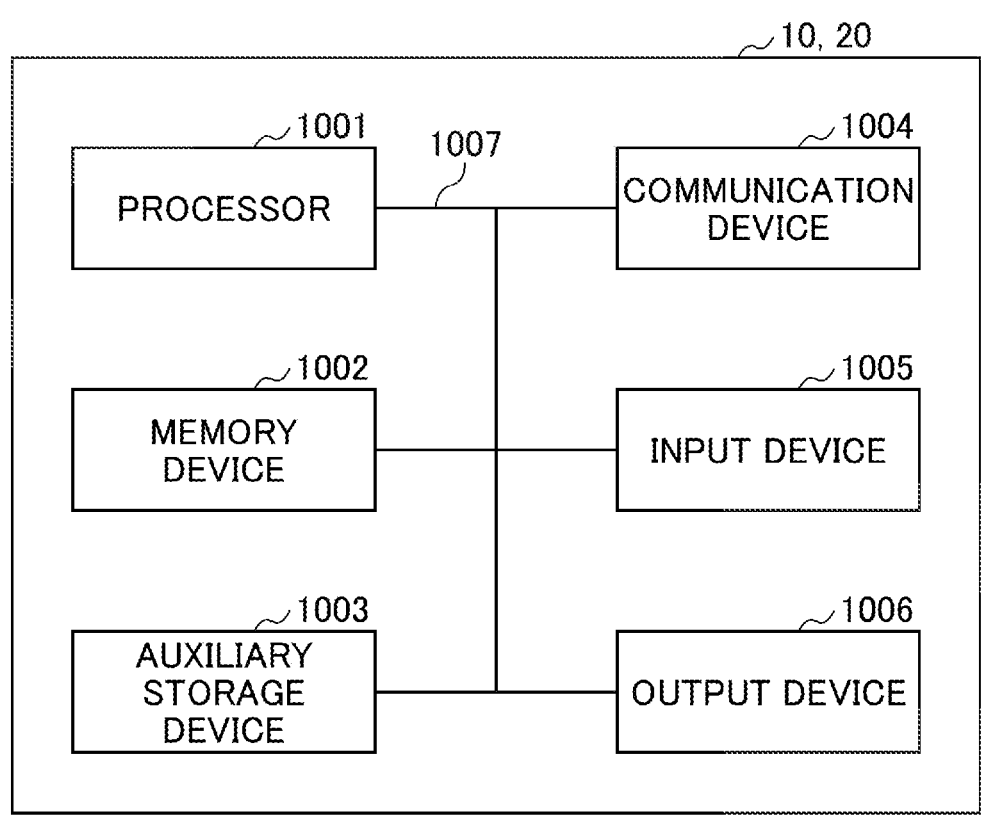
FIG. 10 is a diagram illustrating an example of a hardware configuration of the base station 10 or the terminal 20 according to an embodiment of the present invention.

For example, the base station 10, the terminal 20, or the like in an embodiment of the present disclosure may function as a computer that processes a radio communication method of the present disclosure. FIG. 10 is a diagram illustrating an example of a hardware configuration of the base station 10 and the terminal 20 according to an embodiment of the present disclosure. The base station 10 and terminal 20 described above may be physically configured as a computer device that includes a processor 1001, a memory device 1002, an auxiliary storage device 1003, a communication device 1004, an input device 1005, an output device 1006, and a bus 1007.

Note that in the following description, the term "apparatus" can be read as a circuit, device, unit, or the like. The hardware configuration of the base station 10 and the terminal 20 may be configured to include one or more of the devices illustrated in the drawings or may be configured without including some of the devices.

Each function in the base station 10 and the terminal 20 is implemented by loading predetermined software (a program) on the hardware such as the processor 1001 and the memory device 1002 so as to cause the processor 1001 to execute operations, to control communication by the communication device 1004, and to control at least one of reading and writing data in the memory device 1002 and the auxiliary storage device 1003.

The processor 1001 controls the entire computer, for example, by causing an operating system to run. The processor 1001 may be constituted by a central processing unit (CPU) that includes interfaces with peripheral devices, a control unit, an arithmetic/logic unit, registers, and the like. For example, the control unit 140, the control unit 240, and the like described above may be implemented by the processor 1001.

The processor 1001 also reads a program (a program code), a software module, data, and the like from at least one of the auxiliary storage device 1003 and the communication device 1004 to the memory device 1002 to perform various processes in accordance with these. As a program, a program that causes the computer to execute at least some of the operations described in the above embodiments is used. For example, the control unit 140 of the base station 10 illustrated in FIG. 8 may be implemented by a control program that is stored in the memory device 1002 and runs on the processor 1001. Also, for example, the control unit 240 of the terminal 20 illustrated in FIG. 9 may be implemented by a control program that is stored in the memory device 1002 and runs on the processor 1001. Although the various processes described above are assumed to be executed by the single processor 1001, these may be executed simultaneously or sequentially by two or more processors 1001. The processor 1001 may be implemented by one or more chips. Note that the program may be transmitted from a network via a telecommunication line.

The memory device 1002 is a computer-readable recording medium, and may be constituted by, for example, at least one of a ROM (Read-Only Memory), an EPROM (Erasable Programmable ROM), an EEPROM (Electrically Erasable Programmable ROM), a RAM (Random Access Memory), and the like. The memory device 1002 may be referred to as a register, a cache, a main memory (a main memory device), or the like. The memory device 1002 is capable of storing a program (a program code), a software module, and the like that are executable to implement the communication method according to an embodiment of the present disclosure.

The auxiliary storage device 1003 is a computer-readable recording medium and may be constituted by, for example, at least one of an optical disk such as a CD-ROM (Compact Disc ROM), a hard disk drive, a flexible disk, an optical magnetic disk (e.g., a compact disk, a digital versatile disk, a Blu-ray (registered trademark) disk), a smart card, a flash memory (e.g., a card, a stick, and a key drive), a floppy (registered trademark) disk, a magnetic strip, and the like. The recording medium described above may be, for example, a database, a server, or any other suitable medium that includes at least one of the memory device 1002 and the auxiliary storage device 1003.

The communication device 1004 is hardware (a transceiver device) for communicating with computers via at least one of a wired network and a wireless network, and is also referred to as, for example, a network device, a network control unit, a network card, a communication module, and the like. The communication device 1004 may be configured to include, for example, a radiofrequency switch, a duplexer, a filter, a frequency synthesizer, and the like, for example, to implement at least one of a frequency division duplex (FDD) and a time division duplex (TDD). For example, a transmission/reception antenna, an amplifier unit, a transceiver unit, a transmission line interface, and the like may be implemented on the communication device 1004. The transceiver may be implemented by a transmission unit and a reception unit that are physically or logically separated.

The input device 1005 is an input device (e.g., a keyboard, a mouse, a microphone, a switch, a button, a sensor, etc.) to receive input from the outside. The output device 1006 is an output device (e.g., a display, a speaker, an LED lamp, etc.) to execute outputting to the outside. Note that the input device 1005 and the output device 1006 may have an integrated configuration (e.g., a touch panel).

Each of the devices such as the processor 1001 and the memory device 1002 is connected via the bus 1007 for communicating information. The bus 1007 may be configured by using a single bus or may be configured by using different buses between specific devices.

The base station 10 and the terminal 20 may also be configured to include hardware such as a microprocessor, a digital signal processor (DSP), an ASIC (Application Specific Integrated Circuit), a PLD (Programmable Logic Device), and an FPGA (Field Programmable Gate Array), and with such hardware, some of or all of the functional blocks may be implemented. For example, the processor 1001 may be implemented by using at least one of these hardware components.

Summary of Embodiments

As described above, according to an embodiment of the present invention, a transmission node is provided that includes: a reception unit configured to execute an LBT (Listen before talk) in a time interval immediately before transmitting a signal; a transmission unit configured to transmit a signal in a case where reception power is less than a threshold value in the time interval; and a control unit configured to, in a case where multiple signals are to be transmitted, change control related to the LBT for a signal to be transmitted for a first time and change control related to the LBT for a signal to be transmitted other than for the first time.

According to the configuration described above, in the case where the needs for conflict avoidance between DL-DL, between DL-UL, and between UL-UL and for intercell interference reduction are not as high as with the conventional lower frequencies, the base station 10 or the terminal 20 can start signal transmission at any timing or a timing when a transmission right is obtained by an LBT, regardless of scheduling by the base station 10. In other words, in a radio communication system, the network performance can be improved.

In a case where multiple signals are to be transmitted, and reception power is less than the threshold value in a time interval immediately before transmitting a signal among the multiple signals, the control unit may execute control so as to transmit the multiple signals without executing the LBT for a certain period of time. According to this configuration, the base station 10 or the terminal 20 can start signal transmission for a certain period of time upon obtaining the transmission right by the LBT.

In a case where multiple signals are to be transmitted, and a gap between a signal that has been transmitted and a signal to be transmitted next among the multiple signals is less than a threshold value, the control unit may control the signal to be transmitted next so as to be transmitted without executing the LBT. According to this configuration, in the case where transmission of a next signal is very close to transmission of a signal for which the transmission right is obtained by the LBT, the base station 10 or the terminal 20 can start transmission of the next signal.

In a case where multiple signals are to be transmitted, and a gap between a signal that has been transmitted and a signal to be transmitted next among the multiple signals is less than a threshold value, the transmission unit may transmit the signal to be transmitted next without transmitting a preamble. According to this configuration, in the case where transmission of a next signal is very close to transmission of a signal for which the transmission right is obtained by the LBT, the base station 10 or the terminal 20 can save power by not transmitting the preamble of the next signal.

The reception unit may repeatedly execute the LBT at predetermined timings in a case where the reception power exceeds the threshold value in the time interval. According to this configuration, even in the case where an LBT fails, the base station 10 or the terminal 20 can obtain a transmission right by repeating the LBT at predetermined timings.

In addition, according to an embodiment of the present invention, a communication method is provided that includes: a reception of executing an LBT (Listen before talk) in a time interval immediately before transmitting a signal; a transmission step of transmitting a signal in a case where reception power is less than a threshold value in the time interval; and a control step of, in a case where multiple signals are to be transmitted, changing control related to the LBT for a signal to be transmitted for a first time and change control related to the LBT for a signal to be transmitted other than for the first time.

According to the configuration described above, in the case where the needs for conflict avoidance between DL-DL, between DL-UL, and between UL-UL and for intercell interference reduction are not as high as with the conventional lower frequencies, the base station 10 or the terminal 20 can start signal transmission at any timing or a timing when a transmission right is obtained by an LBT, regardless of scheduling by the base station 10. In other words, in a radio communication system, the network performance can be improved.

Supplement to Embodiments

As above, the embodiments of the present invention have been described; note that the disclosed invention is not limited to the embodiments, and those skilled in the art would understand various modifications, revisions, alternatives, substitutions, and the like. Although the description has been made by using specific numerical examples to facilitate understanding of the invention, unless otherwise stated, these values are merely examples and any suitable values may be used. Partitioning of the items in the above description is not essential to the present invention, and matters described in two or more items may be used in combination as needed, or a matter described in one item may be applied to another matter described in another item (as long as no inconsistency is introduced). The boundaries of functional units or processing units in the functional block diagrams do not necessarily correspond to the physical boundaries of parts. The operations of the multiple functional units may be performed on a single physical part, or the operation of one functional unit may be performed on multiple physical parts. As for the processing steps described in the embodiments, the order of steps may be exchanged as long as no inconsistency is introduced. Although for the sake of convenience of describing processes, the base station 10 and the terminal 20 have been described by using the functional block diagrams, these apparatuses may be implemented by hardware, software, or a combination of these. The software executed by the processor included in the base station 10 according to an embodiment of the present invention and the software executed by the processor included in the terminal 20 according to the embodiment of the present invention, may be stored, respectively, in a random access memory (RA), a flash memory, a read-only memory (ROM), an EPROM, an EEPROM, a register, a hard disk (HDD), a removable disk, a CD-ROM, a database, a server, or any other suitable recording medium.

Indication of information is not limited to the aspects and the embodiments described in the present disclosure, and may be done by using other methods. For example, indication of information may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block)), other signals, or a combination of these. Also, RRC signaling may also be referred to as an RRC message, and may also be, for example, an RRC connection setup message, an RRC connection reconfiguration message, or the like.

The aspects and the embodiments described in the present disclosure may be applied to at least one of systems utilizing LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi) (registered trademark), IEEE 802.16 (WiMAX) (registered trademark), IEEE 802.20, UWB (Ultra-WideBand), Bluetooth (registered trademark), and other suitable systems and next-generation systems extended based on these systems. Also, multiple systems may also be combined (e.g., a combination of at least one of LTE and LTE-A with 5G, etc.) to be applied.

The processing steps, sequences, flowcharts, and the like of the aspects and the embodiments described in the present description may be reordered as long as no inconsistency is introduced. For example, a method described in the present disclosure presents elements of various steps using an exemplary order, and is not limited to the particular order presented.

A specific operation described in the present description to be performed by the base station 10 may be performed by its upper node, depending on circumstances. In a network constituted by one or more network nodes having the base station 10, it is apparent that various operations performed for communication with the terminals 20 may be performed by at least one of the base station 10 and other network nodes (for example, an MME or an S-GW may be considered, but not limited to these) other than the base station 10. In the above description, although a case has been exemplified in which there is a single network node other than the base station 10, the other network nodes may be a combination of multiple other network nodes (e.g., MME and S-GW).

Information, signals, and the like described in the present disclosure may be output from an upper layer (or a lower layer) to a lower layer (or an upper layer). These may be input and output through multiple network nodes.

Information that has been input or output may be stored in a specific location (e.g., memory) or managed by using a management table. Information to be input or output may be overwritten, updated, or added. Information that has been output may be deleted. Information that has been input may be transmitted to other devices.

A determination in the present disclosure may be performed based on a value (0 or 1) represented by one bit; may be performed based on a Boolean value (true or false); or may be performed based on comparison with a numerical value (e.g., comparison with a predetermined value).

Regardless of whether it is referred to as software, firmware, middleware, a microcode, a hardware description language, or any other name, software should be broadly interpreted to mean instructions, an instruction set, a code, a code segment, a program code, a program, a subprogram, a software module, an application, a software application, a software package, a routine, a subroutine, an object, an executable file, a thread, a procedure, a function, and the like.

Also, software, instructions, information, and the like may also be transmitted and received via a transmission medium. For example, if the software is transmitted from a web site, a server, or another remote source by using at least one of a wired technology (coaxial cable, optical fiber cable, twisted pair, digital subscriber line (DSL: Digital Subscriber Line), etc.) and a wireless technology (infrared, microwave, etc.), at least one of these wired technologies and wireless technologies is included in the definition of a transmission medium.

The information, signals, and the like described in the present disclosure may be represented by using any of a variety of different technologies. For example, data, an instruction, a command, information, a signal, a bit, a symbol, a chip, or the like, which may be mentioned throughout the entire description, may be represented by a voltage, a current, an electromagnetic wave, a magnetic field, magnetic particles, an optical field, or photons, or any combination of these.

A term described in the present disclosure and a term necessary for understanding the present disclosure may be replaced by a term having the same or similar meaning. For example, at least one of a channel and a symbol may be a signal (or signaling). Also, a signal may be a message. Also, a component carrier (CC) may also be referred to as a carrier frequency, a cell, a frequency carrier, or the like.

The terms "system" and "network" as used in the present disclosure may be used interchangeably.

Also, information, a parameter, or the like described in the present disclosure may be represented by using an absolute value, may be represented by using a relative value from a predetermined value, or may be represented by using corresponding other information. For example, a radio resource may be one indicated by an index.

A name used for a parameter described above is not a limited name in any respect. Further, a mathematical expression using such parameters may differ from that explicitly disclosed in the present disclosure. Since various channels (e.g., PUCCH, PDCCH, etc.) and information elements can be identified by all suitable names, the various names assigned to these various channels and information elements are not limited names in any respect.

In the present disclosure, terms such as "base station (BS)", "radio base station", "base station", "fixed station", "NodeB", "eNodeB (eNB)", "gNodeB (gNB)", "access point", "transmission point", "reception point", "transmission/reception point", "cell", "sector", "cell", "cell group", "carrier", and "component carrier" may be used interchangeably. A base station may be referred to as another term such as a macro cell, a small cell, a femtocell, a pico cell, or the like.

A base station may accommodate one or more (e.g., three) cells. When a base station accommodates multiple cells, the entire coverage area of the base station may be divided into multiple smaller areas, and each of the smaller areas may also provide communication services by a base station subsystem (e.g., an indoor small base station (RRH: Remote Radio Head)). The term "cell" or "sector" indicates a part or the entirety of the coverage area of at least one of the base stations and base station subsystems providing communications services in this coverage.

In the present disclosure, terms such as "mobile station (MS)", "user terminal", "terminal (or UE: User Equipment)", and "terminal" may be used interchangeably.

A mobile station may be referred to by an ordinary skilled person in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or any other suitable term.

At least one of the base station and the mobile station may be referred to as a transmission apparatus, a reception apparatus, a communication apparatus, or the like. Note that at least one of the base station and the mobile station may be a device mounted on a mobile body, the mobile body itself, or the like. The mobile body may be a means of transportation (e.g., an automobile, an airplane, etc.), an unmanned mobile body (e.g., a drone, an autonomous vehicle, etc.), or a robot (a manned or unmanned type). Note that at least one of the base station and the mobile station includes an apparatus that does not necessarily move during a communication operation. For example, at least one of the base station and the mobile station may be an IoT (Internet of Things) device such as a sensor.

In addition, the base station in the present disclosure may be read as a user terminal. For example, the aspects and embodiments of the present disclosure may be applied to a configuration in which communication between a base station and a user terminal is replaced by communication between multiple terminals 20 (may be referred to as, for example, D2D (Device-to-Device), V2X (Vehicle-to-Everything)). In this case, a configuration may be adopted in which the functions included in the above base station 10 are included in the terminal 20. In addition, the words "uplink" and "downlink" may be read as a wording corresponding to communication between terminals (for example, "side"). For example, an uplink channel, a downlink channel, or the like may be read as a side channel.

Similarly, a user terminal in the present disclosure may be read as a base station. In this case, a configuration may be adopted in which the functions included in the user terminal described above are included in the base station.

The terms "determination (or determining)" and "decision (or determining)" used in the present disclosure may encompass a wide variety of operations. For example, "determination" and "decision" may include "determination" and "decision" made with judging, calculating, computing, processing, deriving, investigating, searching (looking up, search, inquiry) (e.g., search in a table, a database, or another data structure), or ascertaining. Also, "determination" and "decision" may include "determination" and "decision" made with, for example, receiving (e.g., receiving information), transmitting (e.g., transmitting information), input, output, or accessing (e.g., accessing data in a memory). Also, "determination" and "decision" may include "determination" and "decision" made with resolving, selecting, choosing, establishing, or comparing. In other words, "determination" and "decision" may include "determination" and "decision" made with a certain action. Also, "determination" and "decision" may be read as "assuming", "expecting", "considering", or the like.

The terms "connected", "coupled", or every variation of these means any direct or indirect connection or coupling between two or more elements, and may encompass a presence of one or more intermediate elements between two elements "connected" or "coupled" to each other. The coupling or connection between elements may be physical, logical, or a combination of these. For example, "connection" may be read as "access". When used in the present disclosure, such two elements may be considered to be "connected" or "coupled" to each other by using at least one of one or more wires, cables, and printed electrical connections, or by using, as several non-restrictive and non-comprehensive examples, electromagnetic energy having a wavelength of a radio frequency domain, a microwave domain, light (both visible and invisible), and the like.

A reference signal may be abbreviated as an RS (Reference Signal) and may be referred to as a pilot depending on the standard to be applied.

A description using "based on" in the present disclosure does not mean "based only on" unless otherwise specified. In other words, "based on" means both "based only on" and "based at least on".

Any reference to elements specified with the words "first", "second", and so on used in the present disclosure does not limit the amount or the sequence of these elements in general. These words may be used in the present disclosure as a convenient way for distinguishing two or more elements among each other. Therefore, a reference to first and second elements does not mean that only the two elements are assumed, or that the first element should be considered to precede the second element in some way.

A "means" in the configuration of each of the devices described above may be replaced by "unit", "circuit", "device", and the like.

In the present disclosure, when the terms "include", "including", and variations of these are used, it is intended that these terms are as comprehensive as the term "comprising". Further, it is intended that the term "or" used in the present disclosure is not an exclusive OR.

A radio frame may be constituted by one or more frames in the time domain. In the time domain, each of the one or more frames may be referred to as a subframe. The subframe may be further constituted by one or more slots in the time domain. The subframe may have a fixed time length (e.g., 1 ms) that does not depend on the numerology.

The numerology may include a communication parameter that is applied to at least one of transmission and reception of a signal or a channel. The numerology may present, for example, at least one of subcarrier spacing (SCS), bandwidth, symbol length, cyclic prefix length, transmission time interval (TTI), number of symbols per TTI, radio frame configuration, specific filtering performed by a transceiver in the frequency domain, specific windowing performed by a transceiver in the time domain, and the like.

A slot may be constituted by, in the time domain, one or more symbols (OFDM (Orthogonal Frequency Division Multiplexing) symbols, SC-FDMA (Single Carrier Frequency Division Multiple Access) symbols, or the like). A slot may be a unit of time based on the numerology.

A slot may include multiple mini slots. Each mini slot may be constituted by one or more symbols in the time domain. A mini slot may also be referred to as a subslot. A mini slot may be constituted by a fewer number of symbols than a slot. PDSCH (or PUSCH) transmitted with a unit of time greater than a mini slot may also be referred to as PDSCH (or PUSCH) mapping type A. PDSCH (or PUSCH) transmitted by using mini slots may also be referred to as PDSCH (or PUSCH) mapping type B.

Any one of a radio frame, a subframe, a slot, a mini slot, and a symbol represents a unit of time when transmitting a signal. Different names may be used for a radio frame, a subframe, a slot, a mini slot, and a symbol, respectively.

For example, one subframe may be referred to as a transmission time interval (TTI); multiple consecutive subframes may be referred to as a TTI; and one slot or one mini slot may be referred to as a TTI. In other words, at least one of the subframe and the TTI may be a subframe (1 ms) in the existing LTE, may be a period shorter than 1 ms (e.g., 1 to 13 symbols), and may be a period longer than 1 ms. Note that the unit representing TTI may also be referred to as slot, mini slot, or the like.

Here, the TTI means, for example, a minimum unit of time of scheduling in radio communication. For example, in an LTE system, a base station performs scheduling by units of TTIs for each terminal 20 to allocate radio resources (such as frequency bandwidth, transmission power, etc., that can be used by each terminal 20). However, the definition of a TTI is not limited as such.

TTI may be a unit of time to transmit channel-coded data packets (transport blocks), code blocks, code words, and the like, or may be a unit of processing such as scheduling, link adaptation, and the like. Note that when a TTI is given, a time interval (e.g., the number of symbols) to which transport blocks, code blocks, code words, or the like are actually mapped may be shorter than the TTI.

In the case where one slot or one mini slot is referred to as a TTI, one or more TTIs (i.e., one or more slots or one or more mini slots) may be a minimum unit of time of scheduling. Also, the number of slots (the number of mini slots) constituting the minimum unit of time of scheduling may be controlled.

A TTI having a time length of 1 ms may be referred to as an ordinary TTI (a TTI in LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial TTI (or fractional TTI), a shortened subframe, a short subframe, a mini slot, a subslot, a slot, or the like.

Note that a long TTI (e.g., an ordinary TTI, a subframe, etc.) may be read as a TTI having a time length exceeding 1 ms, and a short TTI (e.g., a shortened TTI, etc.) may be read as a TTI having a TTI length shorter than that of a long TTI and longer than or equal to 1 ms.

A resource block (RB) is a unit of resource allocation in the time domain and in the frequency domain, and may include one or more consecutive subcarriers in the frequency domain. The number of subcarriers included in an RB may be the same regardless of the numerology, which may be, for example, 12. The number of subcarriers included in an RB may be determined based on the numerology.

Also, an RB in the time domain may include one or more symbols, and may have a length of one mini slot, one subframe, or one TTI. One TTI, one subframe, and the like may be constituted by one or more resource blocks, respectively.

Note that one or multiple RBs may be referred to as physical resource blocks (PRB), a subcarrier group (SCG), a resource element group (REG), a PRB pair, an RB pair, or the like.

Also, a resource block may be constituted by one or more resource elements (RE). For example, one RE may be a radio resource area of one subcarrier and one symbol.

A bandwidth part (BWP, which may be referred to as a partial bandwidth, etc.) may represent a subset of consecutive common RB (common resource blocks) in terms of certain numerology in a certain carrier. Here, a common RB may be identified by an RB index with reference to a common reference point in the carrier. PRB may be defined in a BWP to be numbered in the BWP.

BWP may include a BWP for UL (UL BWP) and a BWP for DL (DL BWP). One or more BWPs may be configured in one carrier for the terminal 20.

At least one of the configured BWPs may be active, and the terminal 20 does not need to assume performing transmission or reception of a predetermined signal/channel outside the active BWP. Note that "cell", "carrier", or the like in the present disclosure may be read as "BWP".

The structures of radio frames, subframes, slots, mini slots, symbols, and the like described above are merely examples. For example, configurations of the number of subframes included in a radio frame; the number of slots per subframe or radio frame; the number of mini slots included in a slot; the number of symbols and RBs included in a slot or a mini slot; the number of subcarriers included in an RB; the number of symbols included in a TTI; the symbol length; the length of cyclic prefix (CP); and the like, can be changed in various ways.

In the present disclosure, in the case where an article, for example, "a", "an", or "the" in English, is added by translation, the present disclosure may include a plural form the noun following these articles.

In the present disclosure, the term "A and B are different" may mean "A and B are different from each other". The term may mean "A and B are different from C, respectively". Terms such as "separate" and "coupled" may also be interpreted in the same way as "different."

The aspects and embodiments described in the present disclosure may be used individually, may be combined to be used, or may be switched during execution to be used. Indication of predetermined information (e.g., indication of "being X") is not limited to an explicit indication, and may be done implicitly (e.g., by not indicating the predetermined information).

Note that in the present disclosure, the base station 10 and the terminal 20 are examples of a transmission node.

As above, the present disclosure has been described in detail; note that it is apparent to those skilled in the art that the disclosure is not limited to the embodiments described in the present disclosure. The present disclosure may be implemented as a modified and changed aspect without deviating from the purpose and scope of the present disclosure defined by the description of the claims. Accordingly, the description of the present disclosure is intended for illustrative purposes and does not have any restrictive meaning with respect to the present disclosure.

LIST OF REFERENCE NUMERALS

10 base station
110 transmission unit
120 reception unit
130 configuration unit
140 control unit
20 terminal
210 transmission unit
220 reception unit
230 configuration unit
240 control unit
30 core network
1001 processor
1002 memory device
1003 auxiliary storage device
1004 communication device
1005 input device
1006 output device

The invention claimed is:

1. A transmission node comprising:
   a receiver configured to execute an LBT (Listen before talk) in a time interval immediately before transmitting a signal;
   a transmitter configured to transmit a signal in a case where reception power is less than a threshold value in the time interval; and
   a processor configured to, in a case where multiple signals are to be transmitted, change control related to the LBT for a signal to be transmitted for a first time and change control related to the LBT for a signal to be transmitted other than for the first time,
   wherein the transmitter is configured to, when the LBT fails and a subsequent LBT is successful, transmit a transmission signal different from a transmission signal associated with the failed LBT.

2. The transmission node as claimed in claim 1, wherein in a case where multiple signals are to be transmitted, and reception power is less than the threshold value in a time interval immediately before transmitting a signal among the multiple signals, the processor executes control so as to transmit the multiple signals without executing the LBT for a certain period of time.

3. The transmission node as claimed in claim 1, wherein in a case where multiple signals are to be transmitted, and a gap between a signal that has been transmitted and a signal to be transmitted next among the multiple signals is less than a threshold value, the processor controls the signal to be transmitted next so as to be transmitted without executing the LBT.

4. The transmission node as claimed in claim 1, wherein in a case where multiple signals are to be transmitted, and a gap between a signal that has been transmitted and a signal to be transmitted next among the multiple signals is less than a threshold value, the transmitter transmits the signal to be transmitted next without transmitting a preamble.

5. The transmission node as claimed in claim 1, wherein the receiver repeatedly executes the LBT at predetermined timings in a case where reception power exceeds a threshold value in the time interval.

6. A communication method executed by a transmission node, the method comprising:

a reception of executing an LBT (Listen before talk) in a time interval immediately before transmitting a signal;

transmitting a signal in a case where reception power is less than a threshold value in the time interval; and in a case where multiple signals are to be transmitted, changing control related to the LBT for a signal to be transmitted for a first time and changing control related to the LBT for a signal to be transmitted other than for the first time, wherein the transmission node is configured to, when the LBT fails and a subsequent LBT is successful, transmit a transmission signal different from a transmission signal associated with the failed LBT.

\* \* \* \* \*